(12) United States Patent
Puranik et al.

(10) Patent No.: US 10,042,665 B2
(45) Date of Patent: Aug. 7, 2018

(54) CUSTOMER PREMISES EQUIPMENT (CPE) WITH VIRTUAL MACHINES FOR DIFFERENT SERVICE PROVIDERS

(71) Applicant: Verizon Patent and Licensing Inc., Arlington, VA (US)

(72) Inventors: Gagan Puranik, Basking Ridge, NJ (US); Patricia R. Chang, San Ramon, CA (US); Said Soulhi, Boston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 117 days.

(21) Appl. No.: 15/180,500

(22) Filed: Jun. 13, 2016

(65) Prior Publication Data
US 2017/0357528 A1   Dec. 14, 2017

(51) Int. Cl.
| G06F 9/455 | (2018.01) |
| G06F 9/46 | (2006.01) |
| G06F 15/173 | (2006.01) |
| H04L 12/24 | (2006.01) |
| H04L 12/931 | (2013.01) |
| H04L 12/46 | (2006.01) |
| H04L 29/08 | (2006.01) |
| H04L 12/911 | (2013.01) |

(52) U.S. Cl.
CPC ...... *G06F 9/45558* (2013.01); *H04L 12/4641* (2013.01); *H04L 41/0806* (2013.01); *H04L 47/82* (2013.01); *H04L 49/70* (2013.01); *H04L 67/10* (2013.01); *H04L 67/20* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

2015/0333979 A1\* 11/2015 Schwengler ........ H04L 41/5054
709/226
2017/0279682 A1\* 9/2017 Dawson .............. H04L 41/0893

\* cited by examiner

*Primary Examiner* — Bing Zhao

(57) ABSTRACT

A customer premise equipment (CPE) associated with a customer premise forms a virtual machine (VM) and allocates a portion of processing resources and a portion of communications resources included in the CPE to the VM. The processing resources include, for example, general purposes processes and specialized processors for performing certain tasks. The communications resources relate to exchanging data with the CPE. The VM is assigned to a service provider, and service data associated with a service is received from the service provider. The service data to be processed by the VM and the processed service data is forwarded to user devices at the customer premise to provide the service to the user devices. The CPE may form different VMs for different service providers.

17 Claims, 8 Drawing Sheets

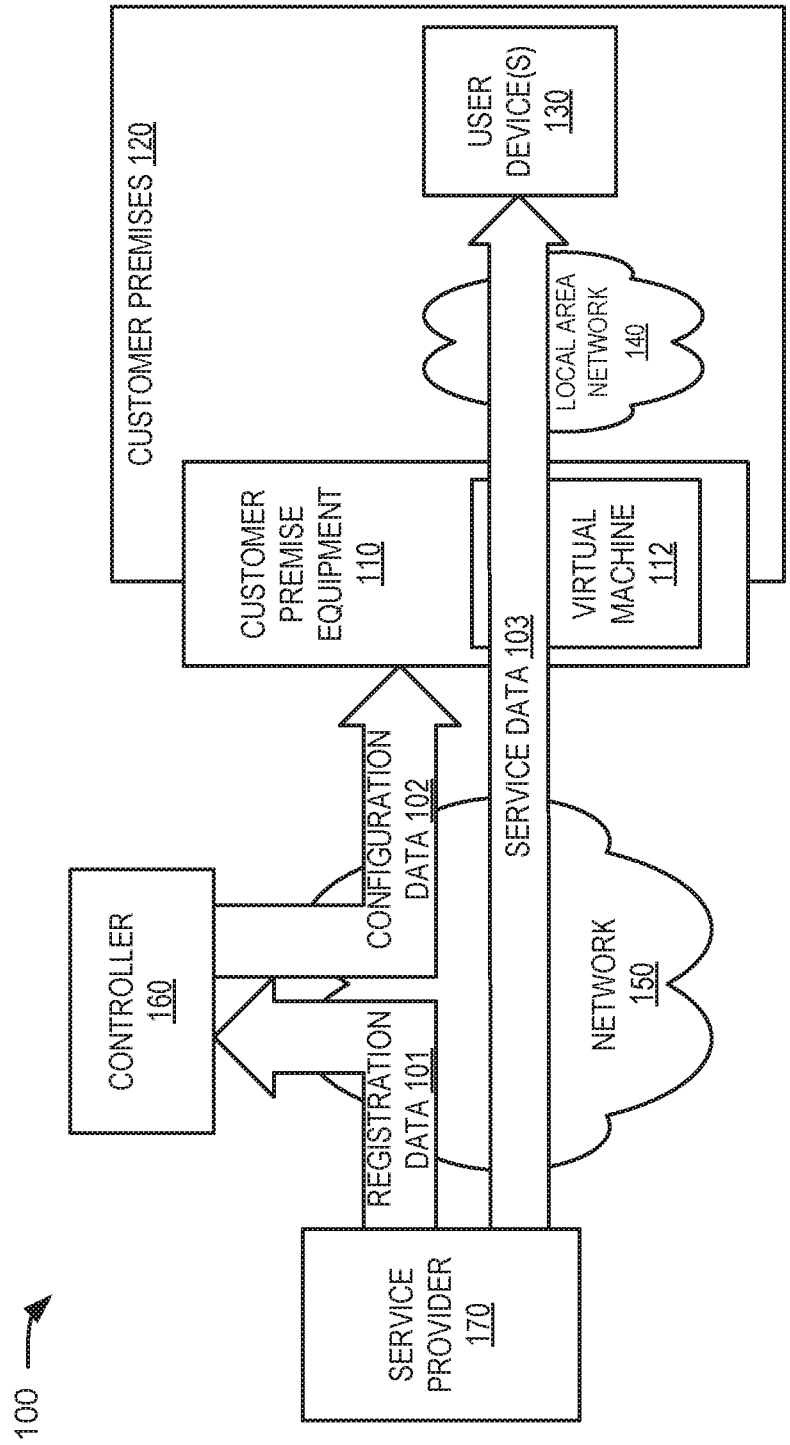

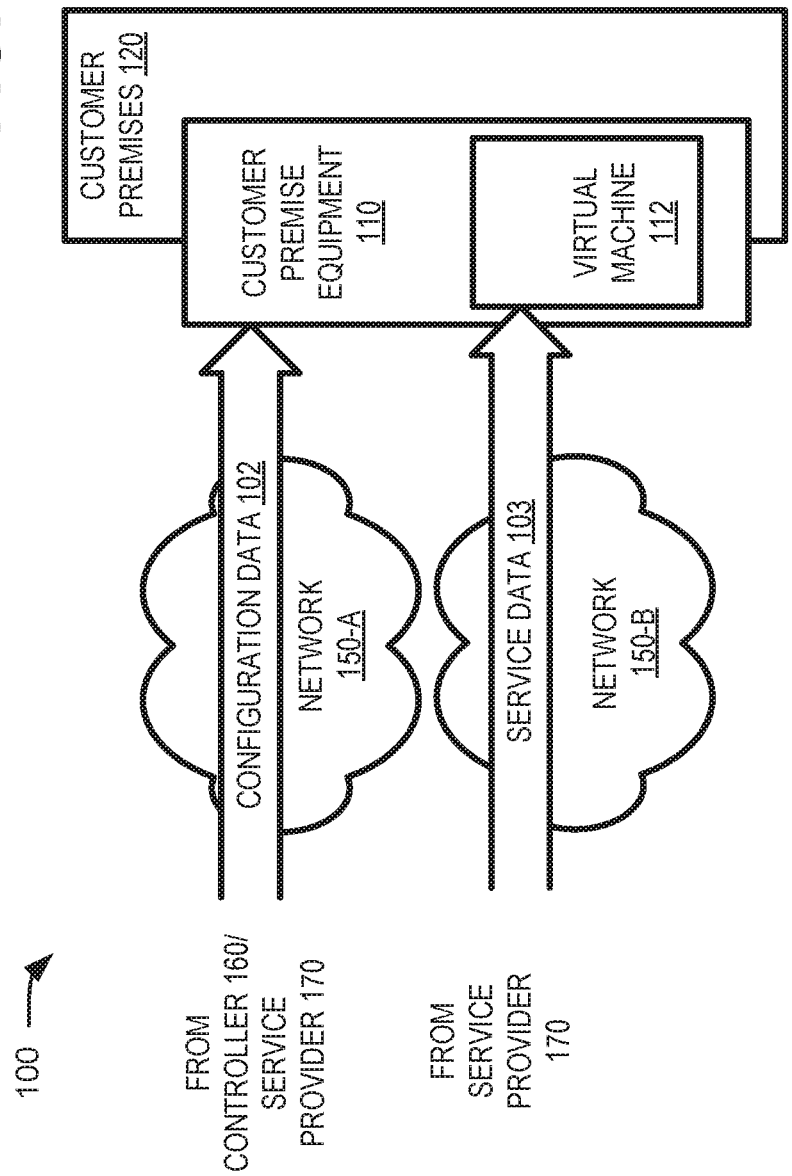

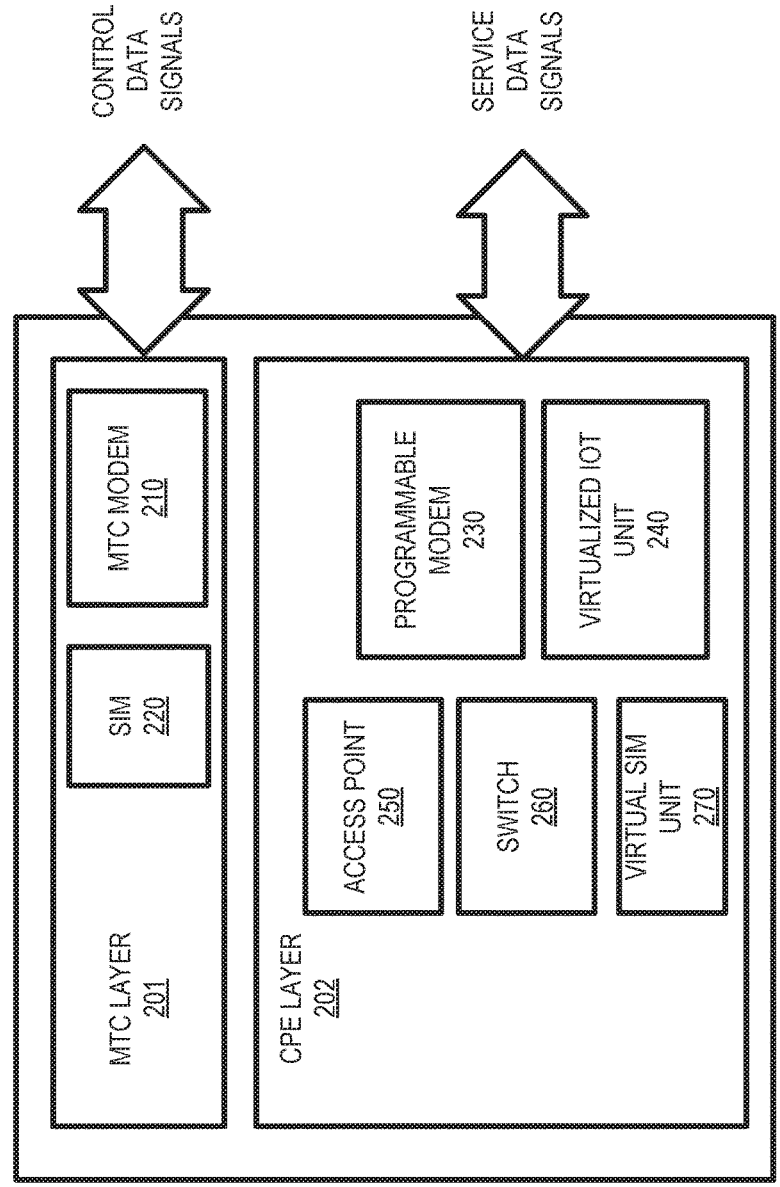

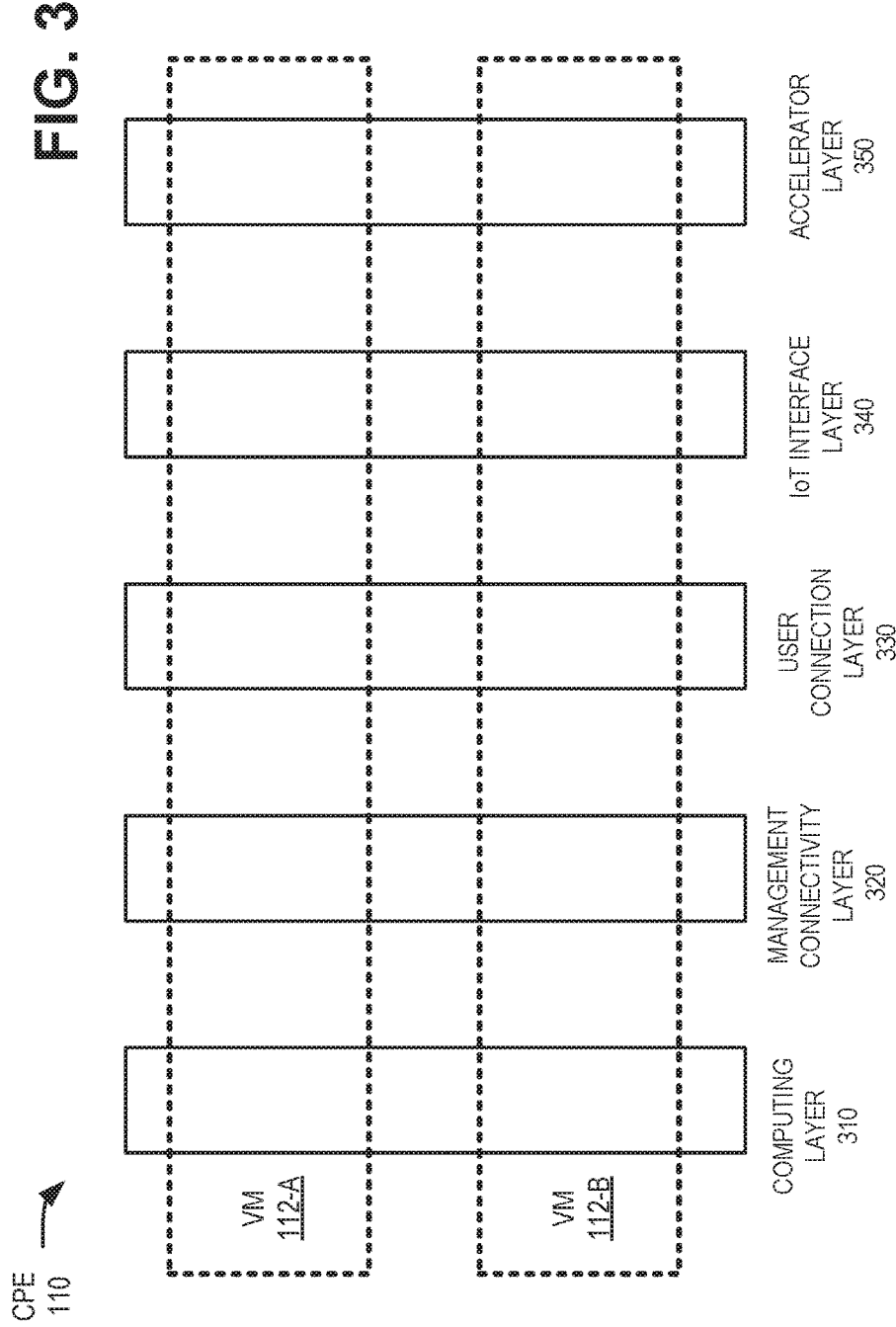

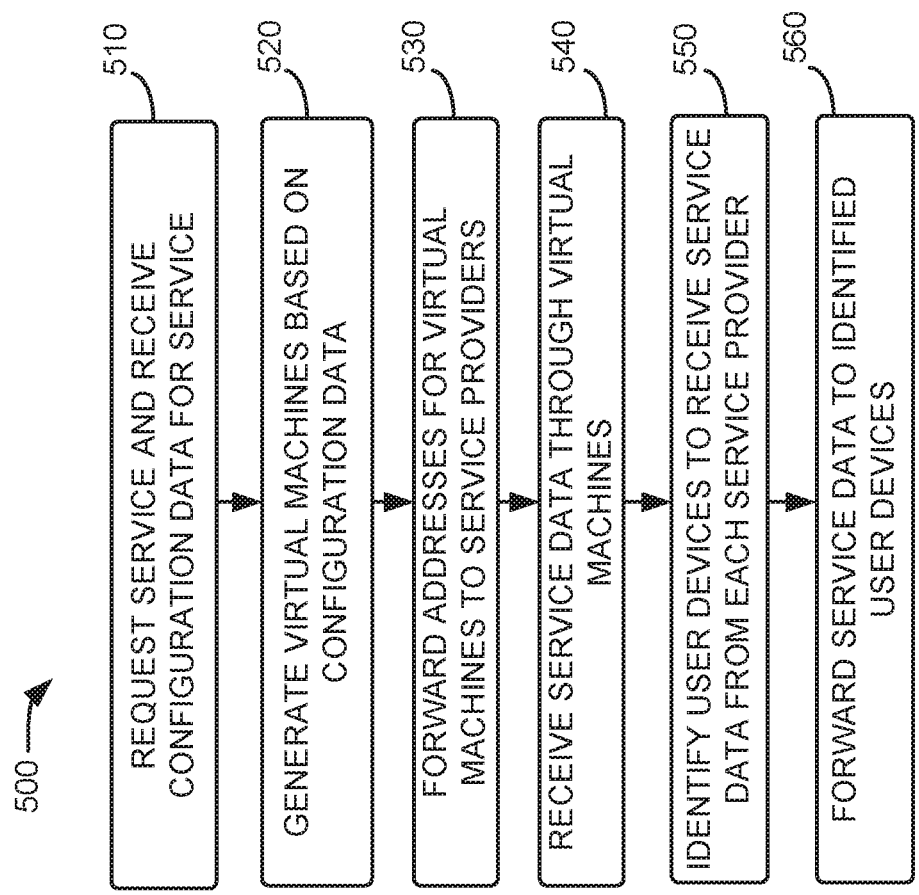

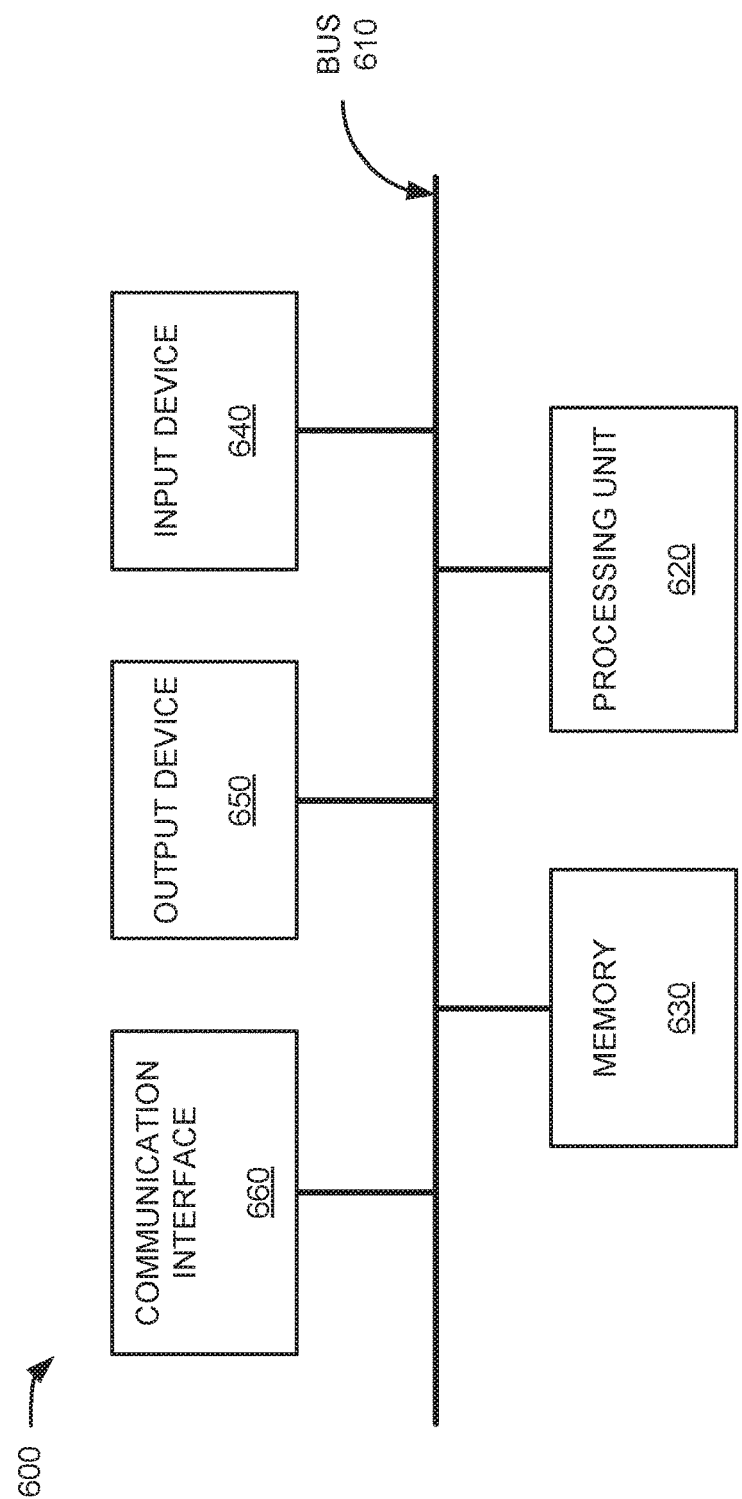

CUSTOMER PREMISES EQUIPMENT (CPE) WITH VIRTUAL MACHINES FOR DIFFERENT SERVICE PROVIDERS

BACKGROUND

Customer premise equipment (CPE) may provide a terminal device at a location associated with a user (e.g., a residence, business, school, etc.), and the CPE may receive data related to services. Typically, a CPE is designed to perform a specific function, such as providing a specific telecommunications or multimedia services based on the received data. Modifying an existing service or providing new service at a customer premise typically includes installing a new CPE or modifying hardware in a CPE already installed at the customer premise. Modifying a CPE or installing a new CPE may include a technician visit to the user's location, resulting in costs and inconvenience.

BRIEF DESCRIPTION OF THE DRAWINGS

FIGS. 1A-1C show an exemplary environment in which systems and/or methods described herein may be implemented;

FIG. 2 shows a diagram of exemplary components that may be included in a customer premise equipment (CPE) included in the environment shown in FIGS. 1A-1C;

FIG. 3 shows a diagram of exemplary components that may be included in a computing device included in the environment shown in FIGS. 1A-1C;

FIG. 5 shows a flow diagram of an exemplary process for providing different services in the environment shown in FIGS. 1A-1C; and FIG. 6 is a diagram illustrating exemplary components of a computing device that may correspond to one or more of the devices illustrated in FIGS. 1A-4.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1B:
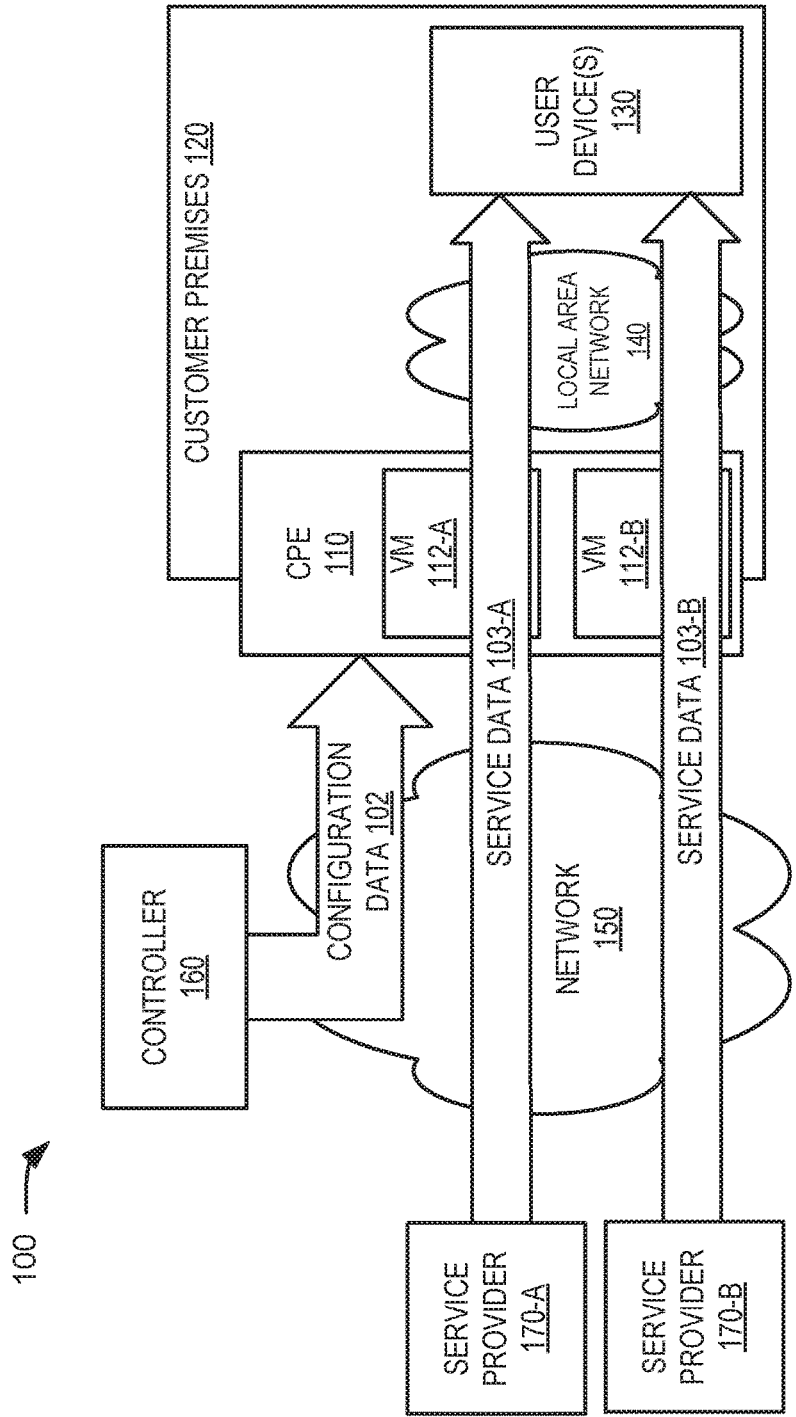

FIGS. 1A-1C are diagrams of an exemplary environment 100 in which systems and methods described herein may be implemented. As illustrated, environment 100 may include customer premise equipment (CPE) 110 located at a customer premises 120, such as a customer's home or office, user devices 130, a local area network (LAN) 140, a network 150, a controller 160, and service provider 170. Although user devices 130 and/or LAN 140 are shown as being located within customer premises 120, it should be appreciated that at least one of user devices 130 may be positioned remotely from customer premises 120 and/or LAN 140 may extend beyond customer premises 120 (e.g., to another customer premises 120). Likewise, although network 150 and controller 160 are shown as being external to customer premises 120, it should be appreciated that portions of network 150 and/or controller 160 may be physically located within customer premises 120.

CPE 110 may act as a hub for communications between customer premises 120 and service providers 170 via network 150. For example, components in service provider 170 and user devices 130 (or other components in customer premises 120) may communicate via CPE 110. As shown in FIGS. 1A and 1B, CPE 110 may exchange data (e.g., service data 103) with user devices 130 via LAN 140 (e.g., a home wired or wireless network). In another implementation (not shown in FIGS. 1A and 1B), a user device 130 be located remotely from customer premise and may connect to customer premises 120 and/or CPE 110 and via wired, wireless, or optical connections (e.g., via network 150). CPE 110 may also enable communications between components within customer premises 120, enabling user devices 130 to communication via LAN 140. In one example, CPE 110 may function as a hot spot to generate LAN 140 or provide a wireless connection using a short-range wireless communication standard such as WiFi or Bluetooth®.

User devices 130 may include a device (e.g., an Internet Protocol (IP)-based device) that is capable of communicating via CPE 110 to obtain service data 103. For example, user devices 130 may include a set-top box (STB) or other device to receive content, such as television programming, VOD content, etc., and provide the content to televisions or other output devices (not shown). In another example, features of user device 130 may be incorporated directly within televisions or other output devices. In another example, user devices 130 include a laptop computer, a tablet computer, a notebook computer, a personal computer (PC), an ultra mobile personal computer (UMPC), a netbook, a game-playing device/console, or other types of computation or communication devices. User devices 130 may also include a communication device, such as a voice over Internet protocol (VoIP) telephone (e.g., a session initiation protocol (SIP) telephone), a personal digital assistant (PDA) that can include a radio, a mobile telephone (e.g., a cell phone), a smart phone (e.g., that may combine a cellular radio with data processing and data communications capabilities), etc.

In one example, user devices 130 may be associated with a user and provide different functions and/or services to the user. In another example, user devices 130 may be associated with different users, and allocate a particular service (e.g., streamed multimedia content) to different users.

LAN 140 may include a wired connection, such as a multimedia over coax (MoCA) connection between CPE 110 and user devices 130. LAN 140 may also connect to CPE 110 to one or more user devices 130 via short-range wireless connections (e.g., WiFi, Bluetooth®, etc.).

Network 150 may include one or more wired, wireless and/or optical networks that are capable of receiving and transmitting data, voice and/or video signals, including multi-media signals that include voice, data and video information. For example, network 150 may include one or more public switched telephone networks (PSTNs) or other type of switched network. Network 150 may also include one or more wireless networks and may include a number of transmission towers for receiving wireless signals and forwarding the wireless signals toward the intended destinations. Network 150 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data. In one example, network 150 may include an optical network, and CPE 110 may receive data from service provider 170 via an optical network terminal (ONT) that converts optical signals from network 150 to electric signals and converts electric signals from CPE 110 to optical signals for transmission to service provider 170.

Continuing with environment 100 in FIG. 1A, controller 160 may receive registration data 101 from service provider 170. Registration data 101 may include information identifying functions and/or tasks to be performed by CPE 110 in connection with service data 103. For example, CPE 110 may perform certain types of processing on service data 103 and forward the processed service data 103 to certain user devices 130. Registration data 101 may further include information identifying CPE 110, customer premises 120, and/or an associated user. Registration data 101 may further include verification data indicating that service provider is authorized to forward service data 103 to CPE 110.

In one example, registration data 101 may include digital rights management (DRM) licenses to user devices 130, and service provider 170 may use related provide related DRM encoding of the digital content. For example, registration data 101 may include information that can be used by CPE 110 and/or user device 130 to decrypt service data 103 that as encrypted using a correspond encryption code.

In another example, registration data 101 may include software that is used by CPE 110 when processing service data 103. For example, registration data 101 may include a program for decoding multimedia content included in service data 103. Controller 160 may forward the program to CPE 110 in configuration data 102.

Registration data 101 may be sent based on a request for a service received from a user device 130 through CPE 110. Controller 160 may intercept/receive a request for service from a user device 130 (e.g., via CPE), identify a service provider 170 associated with the service and forward data from the request to the service provider 170 to solicit registration data 101. Controller 160 may then forward data identifying CPE 110 (e.g., a network address for CPE 110) to service provider 170, to enable service provider 170 to forward service data 103.

Controller 160 may generate and forward configuration data 102 to CPE 110 based on registration data 101. For example, configuration data 102 may include information identifying the tasks and/or functions to be performed by CPE 110 with respect to service data 103. In one example, configuration data 102 may direct CPE 110 to generate a virtual machine (VM) 112 to perform the requested tasks and/or functions. Configuration data 102 may assign an address, such as an Internet protocol (IP) address or a media access control (MAC) address to VM 112. Controller 160 may further direct service provider 170 to forward service data 103 to the assigned address associated with VM 112. In one example, controller 160 may include, in configuration data 102, a piece of software (e.g., that was included in registration data 101) that is used by CPE 110 when processing service data 103.

As used herein, the phrases "assigning" or "allocating" VM 112 to a given service provider 170 is intended to include dedicating VM 112 to handle all communication/processing of service data 103 associated with the given service provider 170 and/or excluding access to the VM 112 by another service provider 170.

In another example, CPE 110 may, additionally or alternatively to assigning or allocating VMs 112 to service providers, assign or allocate software containers to different service providers 170. The containers may be based on a packing format, such as Docker, Linux containers (LXC), OpenVZ, Linux-VServer, Solaris containers, Java servlets, etc. The separate containers may correspond to multiple user-space instances of an operating system of CPE 110. The containers may be used to allocating finite hardware/software resources associated with CPE 110 among the different service providers 170.

In one implementation, controller 160 may store user profile information for users (e.g., a user associated with CPE 110 and/or user devices 130). The user profile information may include various information regarding a user, such as login information (e.g., a user identifier and a password), billing information, address information, types of services to which the user has subscribed, a list of purchases by the user, a user device identifier (e.g., a media player identifier, a mobile device identifier, a set top box identifier, a personal computer identifier) for user device 130, etc. Controller 160 may update the user's profile information based on the user's activity, such as to update the profile information to indicate when the user subscribes to a service associated with service provider 170.

Controller 160 may also manage charging users for services provided via service provider 170, such as performing credit card checks (e.g., for new subscriptions and/or trial subscriptions) and processing payments for subscriptions with service provider 170. For example, for new accounts, controller 160 may initiate credit card checks and receive credit card verification from an external billing entity, such as a credit card payment system (e.g., for a credit card account associated with the user) or a bank payment system (e.g., for a debit account associated with the user) associated with the CPE 110 and/or user device 130, via an external payment API (not shown). For paying (e.g., non-trial) subscribers, controller 160 may also request and receive payments from the external billing entity (e.g., for monthly subscription fees, etc. associated with an account).

Service provider 170 may include one or more computing devices/systems, servers and/or backend systems that exchange service data 103 with customer premises 120 via network 150. These devices and systems may be at a physical location(s) different from customer premises 120. Interactions between service provider 170 and user devices 130 may be performed, for example, using hypertext transfer protocol (HTTP) or secure HTTP (HTTPS) via access network 150. For example, service provider 170 may provide a service subscription that includes entitlements to access a particular library of media. In some situations, service provider 170 may provide a point-to-multipoint interface that delivers multicast services to CPEs 110 located at different customer premises 120. For example, service provider 170 may use internet protocol (IP) multicast addresses for different virtual machines 122 associated with one or more CPEs 110 to direct IP packet flows that can be received simultaneously by user devices 130.

As shown in FIG. 1B, controller 160 may manage access by multiple service providers 170 (shown in FIG. 1B as service providers 170-A and 170-B) to customer premises 120. For example, controller 160 may forward configuration data 102 that directs CPE 110 to form separate VMs 112 (shown in FIG. 1B as VMs 112-A and 112-B) for different service providers 170-A and 170-B. Controller 160 may forward configuration data 102 based on registration data 101 received from service providers 170-A and 170-B. VMs 112-A and 112-B may be associated with different network addresses so that data from service providers 170-A and 170-B (shown in FIG. 1B as service data 103-A and 103-B) may be directed to respective different VMs 112-A and 112-B. For example, each of VMs 112-A and 112-B may be assigned an Internet protocol (IP) address locally through Dynamic Host Configuration Protocol (DHCP).

As described below, configuration data 102 may direct CPE 110 to allocate certain hardware/software resources to each of VMs 112-A and 112-B. Controller 160 may select the allocated resources based on configuration data 102. For example, controller 160 may identify, based on configuration data 102, hardware/software resources to be used by CPE 110 when processing each of service data 103-A and 103-B. Examples of hardware/software resources in CPE that may be allocated to VMs 112-A and 112-B include memory, processing capability, input/output bandwidth on LAN 140 (e.g., to access user devices 130), input/output bandwidth on network 150, specialized processors (e.g., processors implementing a computer program for encoding or decoding (CODEC) video and/or audio data), sensors, etc. In certain situations, hardware/software components of CPE 110 may be allocated to each of VMs 112-A and 112-B. In other situations, VMs 112-A and 112-B may share hardware/software components of CPE 110, such as VM 112-A accessing a hardware/software component of CPE 110 during a time period, and a VM 112-B accessing the hardware/software component of CPE 110 during a second, different time period.

Controller 160 may further direct VM-112-A to forward service data 103-A to certain user devices 130 and may further direct VM-112-B to forward other service data 103-B to different user devices 130. For example, registration data 101 may identify certain user devices 130 or types of user devices 130 to receive each of service data 103-A and service data 103-B.

In another example shown in FIG. 1C, environment 100 may include multiple networks 150 (shown in FIG. 1C as networks 150-A and 150-B). For example, CPE 110 may receive configuration data 102 through a network 150-A that includes a wireless (or mobile) network, such as third generation (3G), fourth generation (4G), or a fifth generation (5G) network. For example, controller 160 and/or service provider 170 may forward configuration data 102 that direct CPE 110 to initiate a given VM 112 having certain characteristics. For example, controller 160 may receive a request from CPE 110 for a service, and controller 160 may an associated service provider 170 to CPE 110. The service provider 170 may forward the configuration data 102 to CPE 110 via first network 150-A. As previously described, configuration data 102 may identify operations to be performed by the given VM 112, components to be included in the given VM 112, etc. Configuration data 102 may further include instructions or code to be executed by VM 112 to provide a service associated with service provider 170.

When initiating the given VM 112, CPE 110 may generate a network address for VM 112 on a secondary network 150-B, and CPE 110 may forward the address to service provider 170. Secondary network 150-B may correspond, for example, to a wired or optical subscriber data network managed by controller 140. In one example, CPE 110 may interact with controller 170 to authorize service provider 170 to forward service data through network 150-B. Service provider may remotely control VM 112 to provide a desired service at customer premises 120.

The configurations illustrated in FIGS. 1A-1C are provided for explanatory purposes. It should be understood that a typical network may include more or fewer devices than illustrated in FIGS. 1A-1C. For example, service provider 170 may be connected via network 150 to numerous customer premises 120. Environment 100 may also include additional elements, such as switches, gateways, routing devices, backend systems, etc., that aid in routing service data 103 from service providers 170 to user devices 130. Also, in some instances, one or more of the components of environment 100 may perform one or more functions described as being performed by another one or more of the components of environment 100.

FIG. 2 is a schematic diagram illustrating exemplary functional components of CPE 110. As shown in FIG. 2, CPE 110 may include a machine-type communications (MTC) layer 201 and a CPE layer 202. As further shown in FIG. 2, MTC layer 201 may include a MTC modem 210 and a subscriber identity module 220, and CPE, layer 202 may include a programmable modem 230, a virtualized Internet of Things (IoT) unit 240, an access point 250, a switch 260, and a virtual SLM 270.

As shown in FIG. 2, MTC layer 201 may function to exchange control data signals (e.g., signals carrying configuration data 102) with controller 160 and/or service providers 170. The control signals may be exchanged by MTC modem 210. In one example, MTC modem 210 may use machine-to-machine (M2M) communications between CPE 110 and components of controller 160 and/or service providers 170. M2M communications may include automated messages forwarded by components associated with controller 160 and/or service providers 170 to establish VMs 112 for handling service data 103. MTC modem 210 may manage multiple different channels between CPE 110 and service providers 170. For example, MTC modem 210 may include multiple different ports (or connections) to network 150, and each of the ports may be associated with a separate communications channels through network 150. MTC modem 210 may manage and allocate different channels to service providers 170 to enable different levels of bandwidth and/or other transmission characteristics (e.g., packet drop rates, delay, between different, jitter, etc.) for the control data signals.

SIM (also referred to as a "SIM card") 220 may be an integrated circuit chip that stores identifying information associated with CPE 110. Data stored by SIM 220 may be used to identify and authenticate CPE 110 to controller 160 and/or service providers 170. In some examples, SIM 220 may be part of a universal integrated circuit card (UICC) physical smart card that is designed to be inserted into a slot or other connection location within CPE 110. SIM 220 may store an integrated circuit card identifier (ICCID), an international mobile subscriber identity (IMSI) number associated with MTC modem 210, and security authentication and ciphering keys or other information.

Control data signals may be forwarded to CPE 110 through based on SIM 220. For example, as described with respect to FIG. 1C, control data 102 may be forwarded to CPE 110 from service providers 170 via a network 150-A, such as wireless network, and the device identifier associated with SIM 220 may be used to route the control signals to CPE 110 through network 150-A.

As further shown in FIG. 2, CPE layer 202 may function to exchange service data signals (e.g., signals carrying service data 103) with service providers 170 and/or user devices 130. For example, CPE 110 may form one or more VMs 112 based on control data 102, and CPE 110 may define separate virtual network addresses for each of the VMs. CPE layer 202 may receive and process the service data signals based on the virtual network address and forward the received service data 103 to associated user devices 130 via LAN 140.

Programmable modem 230 may exchange data (e.g., service data 103) between CPE 110 and service providers 170. In another example, programmable modem 230 may be used to exchange data service data 103 processed by VMs 112) between CPE 110 and user devices 130. Programmable modem 230 may provide multiple channels between VMs 112 to service providers 170 (e.g., through network 150) and to user devices 130 (e.g., through LAN 140). Programmable modem 230 may manage and allocate different channels to enable different levels of bandwidth and/or other transmission characteristics packet drop rates, delay, between different, jitter, etc.) to service providers 170 and/or user devices 130. For example, programmable modem 230 may assign multiple ports and associated channels to carry multimedia content or other data-intensive services to a user device 130, and programmable modem 230 may assign smaller number of ports a single port) to carry service data of a smaller bandwidth to a second, different user device 130.

For example, programmable modem 230 may include reconfigurable antennas and a baseband processor, such as field programmable gate array (FPGA) or a virtual central processing unit (vCPU) to handle the channels to service providers 170 and/or user devices 130. A reconfigurable antenna in programmable modem 230 may be capable of modifying dynamically its frequency and radiation properties in a controlled and reversible manner to enable a dynamic multiple-input/multiple-output (MIMO) configuration (e.g., to enable 8×8 configuration without changing CPE 110). The baseband processor in programmable modem 230 may perform functions related to master control, access control and radio beam forming by the antennas, and the reconfigurable antennas may exchange the radio beams with user devices 130. Network 150 and/or LAN 140 may be wireless WiFi network) and/or wired to connect to CPE 110 using a physical cable (e.g., a universal serial bus (USB) cable) or other wired connection. In another example, programmable modem 230 may exchange data with a service providers 170 and/or user devices 130 through a mobile network, such as third generation (3G), fourth generation (4G), or a fifth generation (5G) network.

Virtualized IoT unit 240 may capture data and forward the captured data. For example, virtualized IoT unit 240 may include a sensor to capture data associated with customer premises 120, such as sensors to determine a temperature, an air pressure, an ambient sound/light levels, etc. associated with customer premises 120. In another example, a sensor in virtualized IoT unit 240 may capture biometric data (e.g., body temperature, hearth rate, finger print, respiration levels, etc.) of a user of CPE 110. In yet another example, a sensor in virtualized IoT unit 240 may collect information regarding CPE 110, such as location and/or movement of CPE 110, an operating status of CPE 110, proximity of CPE 110 to a user device 130, other detected devices in customer premises 120, etc.

In some situations, virtualized IoT unit 240 may access data collected by a sensor located within customer premises 120. For example, virtualized. IoT unit 240 may link to a certain user device 130 to access information collected by a sensor included in that user device 130.

Virtualized IoT unit 240 may also include a virtual processor or microprocessor, such as a FPGA and/or vCPU that functions as a virtual microcontroller of the sensor. The sensor may determine when to captures data and may further determine when to forward the captured data to a user device 130 and/or to service provider 170. For instance, the virtual microcontroller may be mapped onto existing microcontrollers, FPGAs, or CPUs (e.g., X86 central processing units by Intel Corp.). The virtual processor may run as a container or a virtual machine. In one example, the virtual processor may be a very high speed integrated circuit hardware design language (VHDL) circuit that is synthesized on a FPGA.

As shown in FIG. 2, CPE 110 may further include access point 250 and switch 260. Access point 250 may provide LAN 140. For example, access point 250 may provide, as LAN 140, a WiFi connection under the Institute of Electrical and Electronics Engineering (IEEE) 802.11 standards. For example, access point 250 may direct programmable modem 230 to forward an invitation to a user device 130 to join LAN 140 and to process a response to the invitation. Switch 260 may forward data received via network 150 (e.g., service data 103) to user devices 130 via LAN 140. For example, switch 260 may direct programmable modem 230 to forward data received by MTC modem 210 to certain user device(s) 130.

As shown in FIG. 2, CPE 110 may also include a virtual SIM unit 270. Virtual SLM unit 270 may generate and assign an identifier, to CPE 110, that is used to exchange data (e.g., service data 103) with a corresponding service provider 170. Virtual SIM unit 270 may form a separate device identifier for each different service provider 170. Virtual SIM unit 270 may modify a device identifier associated with SIM 220. For example, virtual SIM unit 270 virtual may form an identifier based on the IMSI, the authentication key (KI), a location area identity LAI), a temporary mobile subscriber identity (TMSI), a personal identification number (personal identification number, PIN), a PIN unlocking key (PIN unlocking key, PUK). This generated identifier may be assigned for traffic forwarded between a specific service provider 170 and a selected user device 130. Virtual SIM unit 270 may generate a different identifier (e.g., a "soft SIM") for each service provider 170.

FIG. 3 is a diagram illustrating exemplary functional components of CPE 110. As shown in FIG. 3, CPE 110 may include a computing layer 310, a management connectivity layer 320, user connection layer 330, an IoT interface layer 340, and an accelerator layer 350. As described below, certain resources from one or more of the layers shown in FIG. 3 may be allocated to different VM 112-A and 112-B to enable different services through service data 103-A and 103-B.

Computing layer 310 may include processors or microprocessors that interpret and execute instructions and memory for storing the instructions and results from executing the instructions. In other implementations, computing layer 310 may include one or more application specific integrated circuits (ASICs), field programmable gate arrays (FPGAs), etc. For example, computing layer 310 may include one or more single board computers (SBCs) that include a circuit board with microprocessor(s), memory, input/output (I/O) and other features a functional computing device. In certain implementations, one or more components from computing layer 310 may be allocated to perform functions related to a VM 112, a virtual processor for programmable modem 230, virtualized IoT unit 240, and/or virtual SIM unit 270. For example, computing layer 310 may include multiple processors, and respective portions of the processors may be allocated to different services.

In some situations, computing layer 310 may include a host that operates as a networking/routing stack (also referred to as a router) and a hypervisor (also known as a virtual machine monitor (VMM)).

The host may refer to any logical routing entity that processes network packets and forwards them between physical or logical devices, and the router may perform routing operations, switching operations, firewall operations and/or any other suitable network operations on a network packet. The host may manage the data planes associated with CPE 110 and may be responsible for forwarding network packets to the next hop in the network based on the routing and configuration information received from the control plane. The host operating within computing layer 310 may further provide for one or more of port-based and VLAN (virtual local area network)-based networking, L2 (layer and L3 (layer 3) virtual private networks, internet accessibility, IPv4/IPv6 Routing, L2 (layer 2) and L3 (layer 3) COS (class of service), BFD (bidirectional forward detection), reporting and service level agreements, simple network management protocol (SNMP), and SDN (software defined networking)-management.

The host within computing layer 310 may implement a router for routing and firewall functionality for the CPE 110. Additionally, the network stack associated with the host implements the data plane aspects of the router for processing and forwarding of network packets and may communicate with controller 160 for control plane functionality. The host, when operating in the control plane, may be responsible for system configuration, management and exchange of routing table information. The host may perform these tasks by generating and processing control plane packets either destined to or originated by the components of the CPE 110 and/or other network devices. For example, the host within computing layer 310 may exchange topology information with other network devices or systems and construct/maintain the routing table using routing protocols such as routing information protocol (RIP), open shortest path first (OSPF) or border gateway protocol (BGP).

In certain situations, computing layer 310 may include a first group of processors that are dedicated to routing/data plane functions and a second different, group of processors that are dedicated to control plane functions. In another example, computing layer 310 may include a multicore processor, and respective portions of the multi core processor may be allocated to routing functions and control plane functions. In yet another embodiment, a processing entity may be a group of cores from one or more processors. A processing entity can be any combination of a processor, a group of processors, a core of a processor, or a group of cores of one or more processors. Each data plane may include one or more physical (e.g., network interface card, NIC) or virtual interfaces e.g., local loopback). In certain implementations, the interface may be addressable by a port number.

The host associated with computing layer 310 may also include a hypervisor to manage VMs 112 associated with CPE 110. The hypervisor may be a software or firmware layer responsible for hosting and managing VMs 112. For example, the hypervisor may execute at a higher privilege level than VMs 112 to manage processor and memory resources and/or other resources (e.g., bandwidth to LAN 140 and/or network 150) for each VM 112. In another example, the hypervisor may assign certain caches and/or buses on the processors to enable multiple execution threads that share the execution pipeline and level 1 and level 2 caches.

Management connectivity layer 320 may include SIM 220 and/or virtual SIM unit 270 and may provide a separate, different identifier for CPE 110 to each service provider 170.

User connection layer 330 may include, for example, programmable modem 230, and a virtual microprocessor, such as a FPGA or vCPU, that assigns certain capacity, protocols, transmission frequencies, etc. on programmable antenna to enable a service through service provider 170.

IoT interface layer 340 may include virtualized IoT unit 240 and may perform functions related to collecting data from the IoT sensor and performing certain actions based on the sensor data. For example, if a service provided by CPE 110 relates to controlling environmental conditions in customer premises 120, an IoT sensor (e.g., a thermometer) included in or coupled to CPE 110 may identify an ambient temperature in customer premises 120 and may forward, based on the detected ambient temperature, instructions to a user device 130 that controls a heating/cooling system in customer premises 120.

Accelerator layer 350 may include specific hardware and/or software for processing service data 103. For example, accelerator layer 350 may include task-specific hardware to process certain types of service data 103, such as encoding/decoding certain multimedia content. In other examples, accelerator layer 350 may include a processor for extracting portions of service data 103 and/or encrypting service data 103.

The configurations of CPE 110 in FIGS. 2 and 3 are provided for explanatory purposes. It should be understood that CPE 110 may include different, additional, and/or fewer components than illustrated in FIGS. 2 and 3. Furthermore, it should be appreciated that a function described as being performed by a component of CPE 110 may be performed by a different component of CPE 110.

Figure 4:
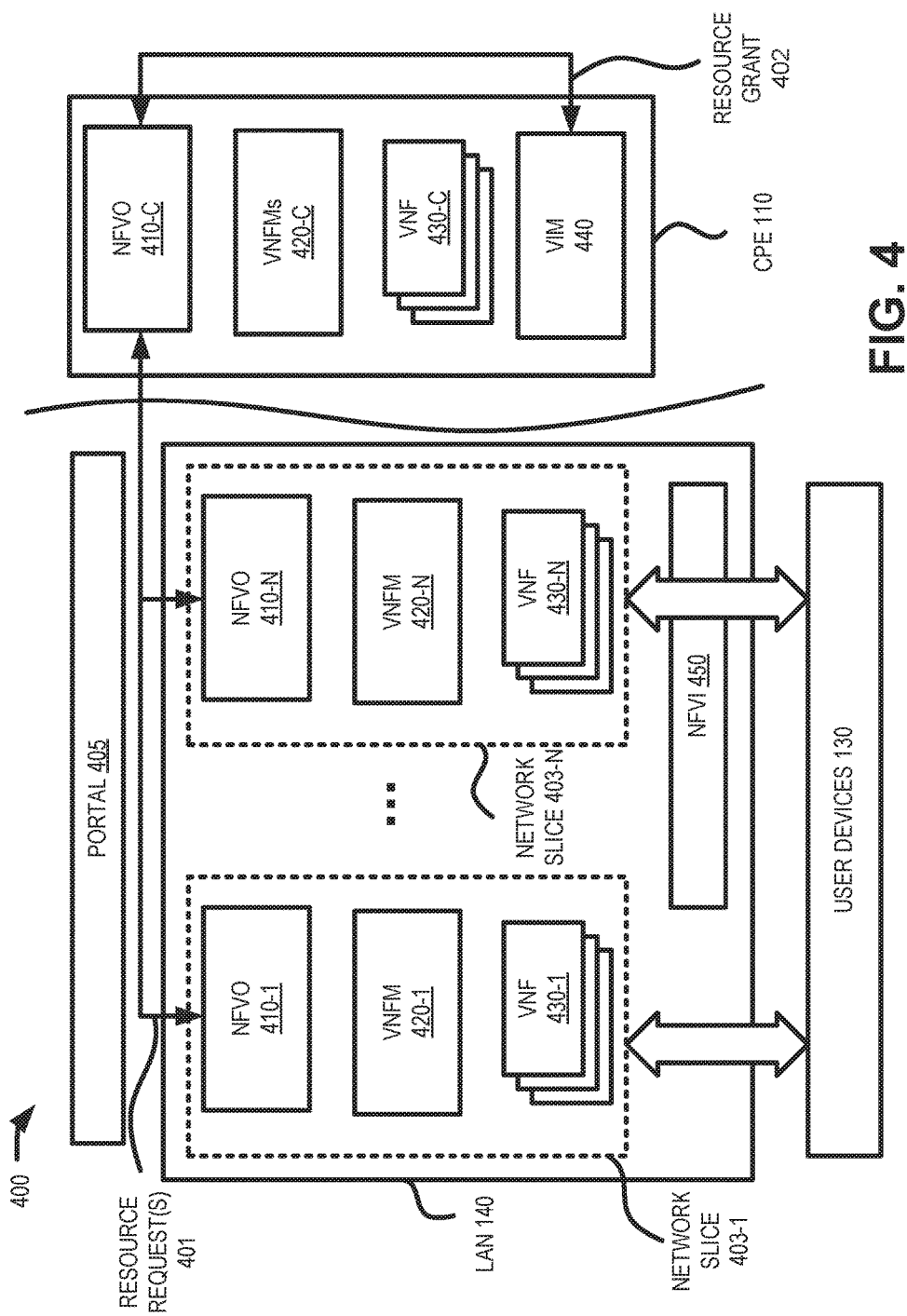
FIG. 4 is a diagram showing an exemplary virtualized network environment for forwarding service data in accordance with an exemplary implementation.

FIG. 4 is a diagram showing an exemplary virtualized network environment 400 for forwarding service data 103 through LAN 140 according to certain implementations. As shown in FIG. 4, virtualized network environment 400 may include a portal 405, network slices 403 through network 150 (shown as network slices 403-1 through 403-N), network functions virtualization orchestrators (NFVOs) 410 (shown in FIG. 4 as NFVOs 410-1 through 410-N associated with network slices 403-1 through 403-N and 410-C associated with CPE 110), virtualized network function managers (VNFMs) 420 (shown in FIG. 4 as VNFMs 420-1 through 420-N and 420-C associated with CPE 110), virtualized network functions (VNFs) 430 (shown in FIG. 4 as VNFs 430-1 through 430-N and 430-C associated with CPE 110), a virtualized infrastructure manager (VIM) 440, and network functions virtualization infrastructure (NFVI) 450.

Network functions virtualization (NFV) relates to allocating computer, storage, and networking resources to build VNFs 430 within network slices 403. Each network slice 403 may be associated with different service providers 170 and/or may carry different types of data from different service providers 170 (e.g., a given network slice 403 may carry multimedia content and another network slice 403 may carry communications data). In another example, a given network slice 403 may be associated with a user device 130 and/or group of user devices 130, such as user devices 130 located within a geographic region and/or a certain type of user devices 130 (e.g., smart phones/tablet computers).

Portal 405 may be a device that provides an interface to receive data (e.g., configuration data 102 and/or service 103) from service provider 170 and identifies a network slice 403 to forward at least a portion of the received data to CPE 110. Service provider 170 may identify certain desired criteria (e.g., bandwidth, transmission delay, packet drop rates, jitter, etc.) for transmission of service data 103 to user device 130.

As shown in FIG. 4, a given network slice 403 may include associated NFVO 410 and VNFM 420 (e.g., network slice 403-1 is associated with NFVO 410-1 and VNFM 1420-1). For example, NFVO 410 may ensure there are adequate computing, storage, and network resources (e.g., within NFVI 450) available to provide a network service through an associated network slice 403. For example, NFVO 410 associated with a given network slice 403 may identify resources to be used by associated VNFs 430 for that network slice 403 and may forward resource requests 401 to CPE 110 to request the identified resources.

For example, as shown in FIG. 4, CPE 110 may include a NFVO 410-C that manages resources across multiple network slices 403, identifies available resources (e.g., within NFVI 450), and allocates the available resources among network slices 403. NFVO 410-C may communicate with VIM 440 to allocate network resources. For instance, VIM 440 may maintain data (e.g., an allocation database) identifying resources that are being used by (or allocated to) certain network slices 403 and further identifying other free resources that are available to be allocated within virtualized network environment 400. When an NFVO 410 associated with a network slice 403 requests network resource (e.g., to transmit service data via the network slice 403), NFVO 410-C may access VIM 440 to identify available resources. NFVO 410-C may assign the available resources to a network slice 403 by forwarding a resource grant 402 that directs VIM 440 to update the resource allocation data to indicate that those resources are being used and, therefore, no longer available for allocation to other network slices 403. When the VNFs 430 complete their tasks (e.g., finish forwarding service data 103), NFVO 410-C may forward another resource grant 402 that directs VIM 440 to update the resource allocation data to indicate that those resources are again available for allocation.

In certain implementation, service provider 170 may identify certain desired transmission characteristics for associated service data 103, such as desired rates of bandwidth, jitter, packet drops, delays, etc, NFVO 410-C may identify resources to allocate to the associated network slice 403 to achieve the desired transmission characteristics. In one example, VIM 440 may also measure performance attributes associated with different nodes within network 150, and NFVO 410-C may identify resources to allocate based on the measured performance attributes. If the desired transmission characteristics cannot be achieved using available network resources, NFVO 410-C may reallocate resources from one network slice 403 to another, different network slice 403.

Continuing with FIG. 4, VNFM 420 may manage associated VNFs 430. For example, VNFM 420 may, when data is received via portal 405, instantiate corresponding VNFs 430 to store, process, and forward the data and scale the instantiated VNFs 430 to handle the received amount of data using the resources obtained by NFVO 410. VNFM 420 may also update and/or upgrade VNFs 430 to reflect changes within LAN 140, such as routing the data through a secondary node based on identifying failure or congestion in a primary node, and modifying the VNFs 430 to maintain desired transmission characteristics when sending the data through the secondary node. VNFM 420 may also terminate one or more VNFs 430 when the data transmission is completed, network resources are needed for transmissions of higher priority data, transmission fails (e.g., a fault occurs in LAN 140), etc.

In one example, CPE 110 may include NFVM 420-C to selectively manage and/or control VNFs 130 across multiple network slices 403. For example, NFVM 420-C may schedule transmission of data in different network slices 403 to manage congestions and/or to improve transmission performance. In another example, NFVM 420-C may allocate a network resource to different network slices 403 during different e periods.

As used herein, network slice 403 may be associated with corresponding VNFs 430 (e.g., network slice 403-1 is associated with VNFs 430-1). VNFs 430 are software implementations of network functions, such as storing, forwarding, and routing data. NFVI 450 may represent the physical resources (e.g., computing, network, and storage resources from various nodes) within network 150, NVFs 430 may relate to how these resources are used within each network slice 403.

As further shown in FIG. 4, certain network slices 403 (shown in FIG. 4 as network slice 403-1) may not access any resources of CPE 110 (e.g., route data without using NFVI 450). For example, network slice 403-1 may manage transmission of service data 103 to user device 130 via a third-party data network, such as the Internet or other public network. For example, VNFs 430-1 may function as virtual client to receive data from service provider 170 and/or as a virtual server to process and forward the received data to user device via the public network.

In one example, certain portions of resources of NFVI 450 may be allocated to corresponding network slices 403. For example, a certain amount of bandwidth, storage space, and computing capacity from NFVI 450 may be allocated to a given network slice 403 to perform associated VNFs 430, such as transmitting service data 103. In this way, each network slice 403 may be configured within virtualized network environment 400 to provide certain desired performance characteristics.

As shown in FIG. 4, CPE 110 may include a library of VNFs 430 (shown in FIG. 4 as VNFs 430-C) and may be selectively used by different network slices 403.

The configuration of virtualized network environment 400 in FIG. 4 is provided for explanatory purposes. It should be understood that virtualized network environment 400 in may include different, additional, and/or fewer components than illustrated in FIG. 4. Furthermore, it should be appreciated that a function described as being performed by a component of virtualized network environment 400 may be performed by a different component of virtualized network environment 400.

FIG. 5 is a flow diagram illustrating an exemplary process 500 for providing services from multiple service providers 170 to user devices 130 located at customer premises 120. In one implementation, process 500 may be performed by CPE 110. In other implementations, process 500 may be performed by one or more other devices of environment 100, such as user device 130, controller 160, and/or service provider 170.

As shown in FIG. 5, process 500 may include requesting a service and receiving configuration data 102 related to the requested service (block 510). For example, as previously described, CPE 110 may forward a request for a service from a given service provider 170, and CPE 170 may receive configuration data 102 from controller 160 related to the given service provider 170. Configuration data 102 may identify processing to be performed by CPE 110 for service data 103 from the given service provider 170. In one example, configuration data 102 may further identify specific user devices 130 or types of user devices 130 to receive service data 103 from a given service provider 170.

Process 500 may further include generating VM 112 based on the received configuration data 102 (block 520). For example, CPE 110 may allocate certain resources for VM 112 from computing layer 310, management connectivity layer 320, user connection layer 330, IoT interface layer 340, and/or acceleration layer 350, as described in FIG. 3. For example, CPE 110 may (1) allocate a portion of management connectivity layer 320 to generate and manage an address for VM 112 to receive service data 103; (2) allocate portions of computing layer 310 and/or acceleration layer 350 to process service data 103; and (3) allocate a portion of user connection layer 330 to forward the processed service data 103 to selected user devices 130. Additionally, CPE 110 may identify based on, for example, configuration data 102 and/or service data 103, a portion of IoT interface layer 340 to allocate to VM 112 to collect and forward IoT sensor data.

CPE 110 may forward the virtual address for VM 112 to service provider 170 (block 530) and may receive service data 103 through VM 112 based on the forwarded address (block 540). For example, CPE 110 may forward information identifying the generated address to service provider 170, and service provider 170 may route service data 103 via network 150 using the address.

Continuing with FIG. 5, process 500 may include CPE 110 identifying user devices 130 to receive service data 103 from service provider 170 (block 550), and forwarding the service data 103 to the identified user devices 130 (block 560). For example, CPE 110 may identify user devices 130 based on configuration data 102. For example, configuration data 102 may identify specific user devices 130 and/or types of user devices 130 to receive services associated with service provider 170. Additionally or alternatively, CPE 110 may identify user devices 130 based on the contents of service data 103. For example, CPE 110 may identify types of user devices 130 that are capable of handling service data 103. For example, if service data 103 relates to a type of multimedia content, CPE 110 may identify user devices 130 that are capable of processing and/or presenting the multimedia content.

While a series of blocks has been described with respect to FIG. 5, the order of the blocks in process 500 may be modified in other implementations. Further, non-dependent blocks may be performed in parallel. Furthermore, process 500 may include additional and/or fewer blocks than shown in FIG. 5. For example, process 500 may further include CPE 110 storing digital contents carried in service data 103 and providing information identifying the stored digital contents to user devices 130.

FIG. 6 is a diagram illustrating exemplary components of a computing device 600. Computing device 600 may correspond, for example, to CPE 110, user devices 130, controller 160, service provider 170, and/or a component of CPE 110 shown in FIGS. 2 and 3 and may be implemented/installed as a combination of hardware and software on one or more computing devices 600. As shown in FIG. 6, computing device 600 may include, for example, a bus 610, a processing unit 620, a memory 630, one or more input devices 640, one or more output devices 650, and a communication interface 660.

Bus 610 may permit communication among the components of computing device 600. Processing unit 620 may include one or more processors or microprocessors that interpret and execute instructions. In other implementations, processing unit 620 may be implemented as, or include, one or more application specific integrated circuits (ASICs), field programmable gate arrays (FPGAs), or the like.

Memory 630 may include a random access memory (RAM) or another type of dynamic storage device that stores information and instructions for execution by processing unit 620, a read only memory (ROM) or another type of static storage device that stores static information and instructions for the processing unit 620, and/or some other type of magnetic or optical recording medium and its corresponding drive for storing information and/or instructions.

Input device 640 may include a device that permits a user to input information to computing device 600, such as a keyboard, a keypad, a mouse, a pen, a microphone, one or more biometric mechanisms, and the like. Output device 650 may include a device that outputs information to the user, such as a display, a speaker, etc.

Communication interface 660 may include any transceiver that enables computing device 600 to communicate with other devices and/or systems. For example, communication interface 660 may include mechanisms for communicating with other devices, such as other devices of network environment 100. In one implementation, communications interface 660 may support short range wireless network communications (e.g., via Bluetooth protocols). In another implementation, communications interface 660 may support long range wireless network communications (e.g., cellular network services). In other implementations, communication interface 660 may support other wired or wireless network communications.

As described herein, computing device 600 may perform certain operations in response to processing unit 620 executing software instructions stored in a computer-readable medium, such as memory 630. A computer-readable medium may include a non-transitory tangible memory device. A memory device may be implemented within a single physical memory device or spread across multiple physical memory devices. The software instructions may be read into memory 630 from another computer-readable medium or read into memory 630 from another device via communication interface 660. The software instructions stored in memory 630 may cause processing unit 620 to perform processes described herein. Alternatively, hardwired circuitry may be used in place of, or in combination with, software instructions to implement processes described herein. Thus, implementations described herein are not limited to any specific combination of hardware circuitry and software.

Although FIG. 6 shows exemplary components of computing device 600, in other implementations, computing device 600 may include fewer components, different components, differently-arranged components, or additional components than those depicted in FIG. 6. As an example, in some implementations, a display may not be included in computing device 600. In these situations, computing device 600 may be a "headless" device that does not include input device 640. Alternatively, or additionally, one or more components of computing device 600 may perform one or more other tasks described as being performed by one or more other components of computing device 600.

Some examples of services associated with service providers 170 are now described. In one example, a given service provider 170 may provide subscription multimedia content, such as streamed video and/or audio content, video-on-demand (VOD) content, e is documents such as e-books, newspapers, magazines, etc. CPE 110 may generate a virtual network address for a VM 112 and may forward virtual network address to the service provider 170. The service provider 170 may forward, as service data 103, the multimedia content to the virtual network address. VM 112 may receive the multimedia content and may forward the content to appropriate user devices 130. In another instance, VM 112 may forward different content to different devices, such as for forward text to an e-reader, multimedia content to a display device, and audio content to an audio playback device. As part of this process, VM 112 may process the received multimedia data, such as to decode the multimedia content into a format that is compatible with a recipient user device 130. In one instance, VM 112 may convert the multimedia content into different formats for different user devices 130.

When forwarding the processed multimedia content, VM 112 may generate a network slice that forwards the multimedia content with desired characteristics, such as to minimize jitter and to maximize bandwidth to provide desired multimedia playback.

In another example, a second service provider 170 may provide a cloud storage system, such as to receive and store content from a user device 130 and to enable the user device 130 (or a second, different user device 130) to access the stored content at a later time. For example, user device 130 may forward, via second VM 112, content to be stored by second service provider 170. When exchanging the content to be stored between the second service provider 170 and a user device, second VM 112 may generate a network slice that exchanges the content with desired characteristics, such as to minimize packet loss. In another example, second VM 112 may identify a later time when more network resources are available (e.g., off-peak) and schedule exchange of the data during this later time.

When forwarding the content to second service provider 170 for storage, second VM 112 may perform certain processing and/or other functions related to storing the content. For example, first service provider 170 may place certain restrictions and/or limitations on storing multimedia content, and second VM 112 may enforce these limitations with respect to storing and accessing the multimedia content. For example, second VM 112 may encrypt the stored content and may only decrypt the stored content for certain user devices 130. In another example, second VM 112 may decrypt the stored content only during a specified time period. In a third example, second VM 112 may maintain metadata related to accessing to the stored content, such as data identifying a previously viewed portion of the stored content, and second VM 112 may enable access to only previously unviewed portion of the stored content.

In yet another example, a third service provider 170 may control user devices 130 or other devices within customer premises 120. For example, third service provider 170 may direct a third VM 112 to collect certain sensor data, such as collecting sensor data from certain IoT devices within customer premises 120 and/or activating a sensor associated with CPE 110. For example, third VM 112 may determine when a user is present at a location within customer premises 120, and third VM 112 may selectively activate lights and/or other environmental controls at that location. Additionally or alternatively, third VM 112 may activate a Wifi access point serving that location, open locks to enable the user to access the location, etc. Similarly, third VM 112 may deactivate environment controls and powered devices, engage locks, etc. at a location within customer premises 120 when a user is not detected in the location.

In another example, third VM 112 may forward voice or electronic messages to a remote user device 130, when the user is not detected within customer premises 120. In another example, third VM 112 may forward a voice or electronic message to an emergency response service when an unauthorized person is detected in customer premises 120 and/or collected sensor data identifies certain conditions. For instance, third VM 112 may request emergency assistance if a temperature sensor identifies an ambient temperature above a threshold level (e.g., a possible fire) or biometric sensors identify a health emergency by a user.

In yet another example, third VM 112 may monitor the status of devices within customer premises 120 (or within an adjacent geographic region) and may detect a failure of the device. For example, third VM 112 may send test data to a user device 130 and determine whether the user device 130 forwards a response. When a failure is detected (e.g., no response is received), third VM 112 may forward a service request identifying the potentially faulty user device 130. Additionally or alternatively, third VM 112 may forward instructions a user identifying the failure and instructing the user on how to address the failure.

In another example, different VMs 112 coordinate different services. For example, third VM 112 may collect sensor data to determine whether a user is present in customer premises 120. If third VM 112 determines that the user is not present in customer premises 120 and/or that a user device 130 for accessing multimedia may have failed, third VM 112 may direct first VM 112 to obtain multimedia content and direct second VM 112 to store the obtained multimedia content. Third VM 112 may further forward a message to a remote user device 130 identifying the stored content and/or enabling the remote user device 130 to access the stored content.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Also, various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   forming, by a processor associated with customer premise equipment (CPE), a virtual machine (VM), wherein forming the VM includes allocating a portion of processing resources included in the CPE and a portion of communications resources included in the CPE to the VM, wherein the CPE includes one or more devices, wherein the CPE is located at a customer premise, wherein a plurality of user devices are located at the customer premise, and wherein the plurality of user devices communicate via the CPE to obtain service data;

assigning, by the processor, the VM to a service provider, wherein the service provider is remote from the CPE;

receiving, by the processor, the service data from the service provider, wherein the service data is associated with a service;

causing, by the processor, the service data to be processed using the portion of the processing resources allocated to the VM;

identifying, by the processor, a subset of the plurality of user devices to receive the service from the service provider;

forwarding, by the processor, the processed service data to the subset of the plurality of user devices using the portion of communications resources allocated to the VM;

forming, by the processor, another VM;

assigning, by the processor, the other VM to another service provider;

receiving, by the processor, other service data from the other service provider;

causing, by the processor, the other service data, from the other service provider, to be processed by the other VM;

identifying, by the processor, another subset of the plurality of user devices; and forwarding, by the processor, the processed other service data to the other subset of the plurality of user devices.

2. The method of claim 1, wherein assigning the VM to the service provider includes:

generating a virtual identifier for the VM; and forwarding the virtual identifier to the service provider, wherein the service provider forwards the service data to the CPE based on the virtual identifier.

3. The method of claim 1, wherein the CPE includes a plurality of processors, and wherein allocating the portions of processing resources included in the CPE to the VM includes assigning one or more of the processors to the VM.

4. The method of claim 1, wherein the CPE includes an Internet of things (IoT) sensor, and wherein forming the VM further includes:

reserving, to the VM, access to the IoT sensor during a time period, wherein another VM cannot access the IoT sensor during a time period based on reserving the IoT sensor for the VM.

5. The method of claim 1, wherein the VM is associated with a virtual identifier and the other VM is associated with another virtual identifier that differs from the virtual identifier, and wherein the method further comprises:

forwarding the virtual identifier to the service provider, wherein the service provider forwards the service data to the CPE based on the virtual identifier; and forwarding the other virtual identifier to the other service provider, wherein the other service provider forwards the other service data to the CPE based on the other virtual identifier.

6. The method of claim 1, wherein forwarding the processed service data to the subset of the plurality of user devices further includes:

forming a local area network (LAN) within the customer premise; and forwarding the processed service data to the subset of the plurality of user devices via the LAN.

7. An apparatus comprising:

a memory configured to store instructions; and a processor configured to execute one or more of the instructions to:

form a virtual machine (VM), wherein the processor, when forming the VM, is further configured to:

allocate a portion of processing resources included in the apparatus and a portion of communications resources included in the apparatus to the VM, wherein the apparatus is located at a customer premise, wherein a plurality of user devices are located at the customer premise, and wherein the plurality of user devices communicate via the apparatus to obtain service data;

assign the VM to a service provider, wherein the service provider is remote from the apparatus;

receive the service data from the service provider, wherein the service data is associated with a service;

cause the service data to be processed using the portion of the processing resources allocated to the VM;

identify a subset of the plurality of user devices to receive the service from the service provider;

forward the processed service data to the subset of the plurality of user devices using the portion of communications resources allocated to the VM;

form another VM;

assign the other VM to another service provider;

receive other service data from the other service provider;

cause the other service data, from the other service provider, to be processed by the other VM;

identify another subset of the plurality of user devices; and forward the processed other service data to the other subset of the plurality of user devices.

8. The apparatus of claim 7, wherein the processor, when assigning the VM to the service provider, is further configured to:

generate a virtual identifier for the VM; and forward the virtual identifier to the service provider, wherein the service provider forwards the service data to the apparatus based on the virtual identifier.

9. The apparatus of claim 7, wherein the apparatus includes a plurality of processors, and wherein one or more of the processors are assigned to the VM.

10. The apparatus of claim 7, wherein the apparatus includes an Internet of things (IoT) sensor, and wherein the processor, when forming the VM, is further configured to:

reserve, to the VM, access to the IoT sensor during a time period, wherein another VM cannot access the IoT sensor during a time period based on reserving the IoT sensor for the VM.

11. The apparatus of claim 7, wherein the VM is associated with a virtual identifier and the other VM is associated with another virtual identifier that differs from the virtual identifier, and wherein the processor is further configured to:

forward the virtual identifier to the service provider, wherein the service provider forwards the service data to the apparatus based on the virtual identifier; and forward the other virtual identifier to the other service provider, wherein the other service provider forwards the other service data to the apparatus based on the other virtual identifier.

12. The apparatus of claim 7, wherein the processor, when forwarding the processed service data to the subset of the plurality of user devices, is further configured to:

form a local area network (LAN) within the customer premise; and forward the processed service data to the subset of the plurality of user devices via the LAN.

13. A non-transitory computer-readable medium to store instructions, the instructions including:
one or more instructions that, when executed by a processor associated with an apparatus, cause the processor to:
form a virtual machine (VM), wherein the processor, when forming the VM, is further configured to:
allocate a portion of processing resources included in the apparatus and a portion of communications resources included in the apparatus to the VM, wherein the apparatus is located at a customer premise, wherein a plurality of user devices are located at the customer premise, and wherein the plurality of user devices communicate via the apparatus to obtain service data;
assign the VM to a service provider, wherein the service provider is remote from the apparatus;
receive the service data from the service provider, wherein the service data is associated with a service;
cause the service data to be processed using the portion of the processing resources allocated to the VM;
identify a subset of the plurality of user devices to receive the service from the service provider;
forward the processed service data to the subset of the plurality of user devices using the portion of communications resources allocated to the VM;
form another VM;
assign the other VM to another service provider;
receive other service data from the other service provider;
cause the other service data, from the other service provider, to be processed by the other VM;
identify another subset of the plurality of user devices; and
forward the processed other service data to the other subset of the plurality of user devices.

14. The non-transitory computer-readable medium of claim 13, wherein one or more instructions further cause the processor, when assigning the VM to the service provider, to:
generate a virtual identifier for the VM; and
forward the virtual identifier to the service provider, wherein the service provider forwards the service data to the apparatus based on the virtual identifier.

15. The non-transitory computer-readable medium of claim 13, wherein the apparatus includes a plurality of processors, and wherein one or more instructions further cause the processor to assign one or more of the processors to the VM.

16. The non-transitory computer-readable medium of claim 13, wherein the apparatus includes an Internet of things (IoT) sensor, and wherein one or more instructions further cause the processor, when forming the VM, to:
reserve, to the VM, access to the IoT sensor during a time period, wherein another VM cannot access the IoT sensor during a time period based on reserving the IoT sensor for the VM.

17. The non-transitory computer-readable medium of claim 13, wherein the VM is associated with a virtual identifier and the other VM is associated with another virtual identifier that differs from the virtual identifier, and wherein one or more instructions further cause the processor to:
forward the virtual identifier to the service provider, wherein the service provider forwards the service data to the apparatus based on the virtual identifier; and
forward the other virtual identifier to the other service provider, wherein the other service provider forwards the other service data to the apparatus based on the other virtual identifier.

* * * * *